United States Patent
Turk et al.

(10) Patent No.: US 7,143,062 B2
(45) Date of Patent: *Nov. 28, 2006

(54) ELECTRONIC CASH ELIMINATING PAYMENT RISK

(75) Inventors: James J. Turk, North Conway, NH (US); Geoffrey Turk, New York, NY (US)

(73) Assignee: GM Network Limited (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 118 days.

(21) Appl. No.: 09/340,566

(22) Filed: Jun. 28, 1999

(65) Prior Publication Data

US 2002/0004779 A1 Jan. 10, 2002

Related U.S. Application Data

(60) Division of application No. 08/921,760, filed on Aug. 26, 1997, now Pat. No. 5,983,207, which is a continuation-in-part of application No. 08/465,430, filed on Jun. 5, 1995, now Pat. No. 5,671,364, which is a continuation-in-part of application No. 08/015,588, filed on Feb. 10, 1993, now abandoned.

(51) Int. Cl.
   *G06F 17/60* (2006.01)
(52) U.S. Cl. .............. 705/38; 705/39; 705/68; 705/69
(58) Field of Classification Search .......... 705/38–39, 705/26, 27, 28, 35, 65, 66, 67, 68–69, 37, 705/42, 74; 235/379, 380
See application file for complete search history.

(56) References Cited

U.S. PATENT DOCUMENTS

| 3,573,747 A | 4/1971 | Adams et al. ............ 340/172.5 |
| 4,503,503 A | 3/1985 | Suzuki ........................ 705/400 |
| 4,529,870 A | 7/1985 | Chaum ........................ 235/380 |
| 4,694,397 A | 9/1987 | Grant et al. ................. 364/408 |
| 4,759,063 A | 7/1988 | Chaum .......................... 380/30 |
| 4,759,064 A | 7/1988 | Chaum .......................... 380/30 |
| 4,851,999 A | 7/1989 | Moriyama .................... 705/30 |
| 4,914,698 A | 4/1990 | Chaum .......................... 380/30 |

(Continued)

OTHER PUBLICATIONS

Dialog File 15, Accession No. 01427279, Muhammad, "Electronic commerce and the future of money", Black Enterprise v2711 pp. 255-261, Jun. 1997.*

(Continued)

*Primary Examiner*—Romain Jeanty
(74) *Attorney, Agent, or Firm*—St. Onge Steward Johnston & Reens LLC

(57) ABSTRACT

A system and method for permitting gold or other commodities to circulate as currency requires a network of system users that participate in financial transactions where payment is made in units of gold. The gold is kept in secure storage at a deposit site for the benefit of the users. The payments in gold are effected through a computer system having data storage and transaction processing programs that credit or debit the units of account of gold for the account of each system user. The system and method allows gold to circulate as an electronic payment through the global computer network (Internet) and/or private communication networks. The sum total of all circulating electronic gold (denominated in physical measures such as weights such as grams and/or ounces and fractions thereof) will equal the weight of all the gold held for safekeeping at the storage site(s) for the users of the system.

3 Claims, 3 Drawing Sheets

Encoded measure of the commodity: XX2ufeydufy56

Encoded unique serial number: xcx 1298fad965rd967b3g xcx

5679t14357 xcx 14126589g58 xcx 156rt146346XX

Encoded name of specific storage site

Encoded date/time stamp

Digital Hallmark™ (digital signature)

U.S. PATENT DOCUMENTS

| | | | | |
|---|---|---|---|---|
| 4,926,480 A | | 5/1990 | Chaum | 380/23 |
| 4,947,430 A | | 8/1990 | Chaum | 380/25 |
| 4,949,380 A | | 8/1990 | Chaum | 380/30 |
| 4,977,595 A | * | 12/1990 | Ohta et al. | 705/69 |
| 4,988,849 A | | 1/1991 | Sasaki et al. | 235/379 |
| 5,010,485 A | | 4/1991 | Bigari | 364/408 |
| 5,131,039 A | | 7/1992 | Chaum | 380/23 |
| 5,189,700 A | | 2/1993 | Blandford | |
| 5,224,162 A | | 6/1993 | Okamoto et al. | 380/24 |
| 5,258,908 A | | 11/1993 | Hartheimer et al. | 364/408 |
| 5,276,736 A | | 1/1994 | Chaum | 380/24 |
| 5,285,383 A | * | 2/1994 | Lindsey et al. | 705/26 |
| 5,303,383 A | | 4/1994 | Neches et al. | 395/500 |
| 5,453,601 A | | 9/1995 | Rosen | 235/379 |
| 5,455,407 A | | 10/1995 | Rosen | 235/380 |
| 5,493,614 A | | 2/1996 | Chaum | 380/30 |
| 5,511,121 A | * | 4/1996 | Yakobi | 380/24 |
| 5,521,980 A | | 5/1996 | Brands | 380/30 |
| 5,539,825 A | | 7/1996 | Akiyama et al. | 380/24 |
| 5,666,493 A | | 9/1997 | Wojcik et al. | 705/26 |
| 5,677,955 A | * | 10/1997 | Doggett et al. | 705/76 |
| 5,768,385 A | * | 6/1998 | Simon | 705/69 |
| 5,812,668 A | | 9/1998 | Weber | 380/24 |
| 5,832,089 A | | 11/1998 | Dravitz et al. | 380/24 |
| 5,850,446 A | | 12/1998 | Burger et al. | 380/24 |
| 5,873,071 A | * | 2/1999 | Ferstenberg et al. | 705/37 |

OTHER PUBLICATIONS

Dialog File 275, Accession No. 02069436; Roosevelt, "Electronic Commerce", Network VAR, v5, n5, p. 26(7), May 1997.*

"WordPerfect for Windows";1992 Novell.*

McAndrews, James. "Making Payments on the Internet" Business Review—Federal Reserve Bank of Philadelphia. [downloaded from PROQUEST] Jan./Feb. 1997, pp. 3-7, 10-14.*

Buck, Peter. "Electronic Commerce—Would, Could and Should you Use Current Internet Payment Mechanisms?" Internet Research [downloaded from PROQUEST], vol. 6, No. 2/3, 1996, pp. 5-18 [13 pages].*

Dialog "Taxation: Commission Plans Common VAT System for Gold"; Nov. 1992; European Report, n1808; Dialog file 636, accession No. 01943780.*

Weber "Gold can be your portfolio's ballast"; Dec. 1990; Medical Economics, V67, n24, p. 59(6); Dialog file 148, Accession No. 04920154.*

Image of Silver Certificate.*

DigiCash—Company Brochure "DigiCash—Numbers That Are Money" Jun. 11, 1997; 4 Pages.

* cited by examiner ized Aug. 26, 1997, now issued as U.S. Pat. No.

ELECTRONIC CASH ELIMINATING PAYMENT RISK

This is a divisional application of our application Ser. No. 08/921,760 filed Aug. 26, 1997, now issued as U.S. Pat. No. 5,983,207, which is a continuation in part of my application Ser. No. 08/465,430, filed Jun. 5, 1995, now issued as U.S. Pat. No. 5,671,364; which is a continuation in part of application Ser. No. 08/015,588, filed Feb. 10, 1993, now abandoned.

FIELD OF THE INVENTION

This invention relates to electronic transaction systems, and more specifically to a system using an asset-based electronic cash system.

BACKGROUND OF THE INVENTION

In the historic past, precious metals circulated as currency. The metals circulated mainly in the form of coins, and over time improvements were made to coins to improve their reliability. These improvements included, for example, detailed engraving on the face and obverse of the coin, and milling of edges. These improvements were intended to prevent the clipping of coins, which was a process that lightened the weight of the coin. When this practice occurred, the coin was debased, i.e., it lost purchasing power because the coin no longer constituted the weight of gold it was purported to constitute. Each debasement interfered with normal trade and commerce, and these interferences impeded economic activity in general. Subsequently, debasement of coin became subtler, and frequently included substitution of a base metal for the gold.

The circulation of precious metals coins was in time supplanted by certificates during the period from 1680–1840. By this method of currency, the coins of precious metal remained in safe and secure storage, typically a vault facility maintained by a bank or warehouse company. A certificate of deposit, a paper document, was issued by the bank or warehouse company and evidenced the deposit of coin that had been made into the facility, and the certificate of deposit began circulating as a substitute for the coin. Circulation of the certificate, in lieu of the coins, offered numerous advantages. Paper was easier to transport, and a relatively small amount of certificates could be used to complete transactions of high value. There was less risk of debasement of the coin that was stored. However, while these advantages significantly improved the circulating medium, there were also disadvantages. These include forgery of paper certificates, fraud and bankruptcy of the bank or warehouse company.

As a result, another improvement to currency soon emerged. This improvement in the nature of currency was the creation of deposit currency. Deposit currency is a process that enables paper money and/or coin to circulate as currency. By this method of currency, the coins of precious metal and/or the paper currency that represented a claim to those coins, remained in safe and secure storage, typically a vault facility maintained by a bank. Circa 1840 to the present, the circulation of coin and paper money for commercial transaction was supplanted by deposit currency, i.e., money is now moved around mainly by checks and wire transfers.

The creation of deposit currency significantly improved the circulating medium. It was no longer necessary to extensively rely on coins, which could be clipped, debased, etc., nor on paper money, which could be counterfeited. By moving monetary units of account on deposit in one bank to another bank, the process of payments was significantly enhanced.

However, in time unforeseen problems have appeared which detract from the use of deposit currency as a medium of exchange. The institutions in which clients lodge their money and deposit currency sometimes are unable to meet their commitment to their clients to return the clients' coin or paper money. The institutions, typically banks, which accept the deposits of coin and paper money from their client, loan the coin and paper money to other clients. Occasionally these borrowers failed to repay their loans, causing the bank to take a loss. Cumulatively these losses can be large enough to cause the bank to fail. A bank in that case no longer has sufficient coin or paper money to repay its liabilities to its clients.

Because bank failures have caused great harm, much effort has been expended to prevent bank failures where possible and to limit the adverse impact on economic activity should a bank fail. For example, government programs have been implemented to insure depositors that their money will be returned, or that they will otherwise still be able to have access to the value of their deposit currency. The deposit insurance programs are limited to some maximum amount, preferably $100,000, so bank clients with deposits greater than the insured amount are at risk for the amount of their deposit currency above the insured limit.

A particular problem is the payment risk now inherent in existing payment mechanisms, and the problem of "float." Payment risk arises in conventional banking systems where a financial institution accepts deposits, then in turn loans out that money to others. This is known as "fractional banking," in that the financial institution only keeps on hand a fraction of the actual assets it is holding for the account of its depositors. If the financial institution fails due to bad loans or fraud, the financial institution lacks sufficient assets to pay off its depositors. This practice has lead to significant losses in connection with financial institution failures such as the Herstatt Bank in Germany and the BCCI scandal. A related payment rise arises due to the fluctuating value of national currencies due to inflation and currency exchange rate variations dependent on the economy of the nation issuing the currency. Thus, there is a risk incurred by accepting national currencies.

"Float" is the amount of time a payment must wait for a transaction to be processed. This is considered an expense because of the unavailability of funds, which represents opportunity costs. In order to eliminate these payment risks and float, my invention uses an asset (like gold) instead of a liability (national currency) for settling payments.

Recent advances in the field of cryptography have made possible the secure and privacy-protected transfer of digital information over insecure, open communication channel such as the global computer network known as the "Internet", by using public key encryption technologies.

Public key encryption methods have been developed for use in electronic cash. In one such method known as the RSA algorithm, encryption and decryption are accomplished by two mathematical equations which are related as inverses of each other. These equations are the private key, used by the issuing financial institution to digitally sign, or certify, a note, and the related public key, used by the recipient to determine and verify the existence of a valid signature on the note. Such protocols are known in the art and are described for example in Chaum, U.S. Pat. No. 4,759,063, and disclosure of which is hereby incorporated by reference.

In addition to such digital signature methods for certifying a digital note, a blind signature protocol has been developed so that the certifying financial institution cannot determine the note which it has certified, allowing the user to maintain his privacy. In such systems the user "binds" the note he submits to the financial institution for its digital signature, the financial institution applies its digital signature to certify the note, and the user then unblinds the note and uses it to make a payment to a payee. A blind signature system is described in Chaum, U.S. Pat. No. 4,759,063 which has been incorporated by reference, and is in commercial use by DigiCash b.v. of the Netherlands.

In order to prevent a user from spending the note more than once, methods have been developed for testing the note to determine if it has already been spent. In one such system, if a note is spent twice, the identity of the user is revealed. Such a system is more suitable for lower value payments and is disclosed for example in Chaum, U.S. Pat. No. 4,914,698. For higher value payments, the payee will verify the status of the received note with the issuing financial institution, which will keep a database of issued and spent notes.

In still other methods, notes may be generated that can have plural currency values (like a wallet containing $10, $5, and $1 bills) or which can have a variable value as portions of the note are spent. Such methods are disclosed in Chaum, U.S. Pat. No. 4,949,380, which is hereby incorporated by reference.

In summary, such public key signature systems allow an issuing financial institution to digitally sign an electronic note with its secret key such that the user, and the ultimate payee, can verify the authenticity of the note and the ability to make payment. The blinding protocol protects the user's privacy by preventing the financial institution from tracing a note subsequently presented to it for payment as cash.

In such systems, the electronic note signed by the issuing financial institution is denominated in a national currency. In my prior copending application Ser. No. 08/465,430, now issued as U.S. Pat. No. 5,671,364, which is hereby incorporated by reference, I have described the problems associated with payment systems based on national currencies and the problems associated with common banking practices.

OBJECTS OF THE INVENTION

Accordingly, it is an object of the present invention to increase efficiency and surety of electronic cash payments by introducing a digital transaction system whose unit of account is an asset, as opposed to all other current electronic cash whose units of account are liabilities, thereby eliminating problems of payment risk inherent in current banking and electronic cash systems.

Another object is to increase security and privacy of said asset-based digital transaction system by using security methods.

It is an object of the invention to provide a method and system for a commodity-based currency for payment of accounts that avoids the problems of prior art and deposit currency account systems. It is an object of the invention to provide such a system and method which is independent of external events that cause fluctuations in value of national currencies.

In accordance with one embodiment of the invention, a commodity based currency system for paying accounts comprises: at least one storage site having secure facilities for storage of a valuable commodity; an amount of a commodity stored at the storage site; and a computer system for implementing and recording transactions defined in units of the commodity. The accounting of the transactions is denominated in units of the commodity. The computer system includes: an account data storage device, a transaction data storage means, and a transaction posting means. The account data storage device is capable of recording data identifying persons and a number of units of the commodity created to each of the persons and held in the storage site for the account of the persons. The transaction data storage device receives records of transactions denominated in units of the commodity. These records of transactions include an identification of a person who will receive a debit, a person who will receive a credit, the amount of such debit, and the amount of such credit. The transaction posting means extracts data from the records of transactions and posts debits and credits to the account data storage device to update the data identifying the number of units of the commodity held for the account of each person involved in the transaction.

The system preferably permits remote access to submit transaction records, and provides verification means for verifying the bona fides of the person seeking to submit transaction records.

In a preferred embodiment, the commodity comprises a precious metal, such as silver, or most preferably, gold of a specified purity.

Other objects, aspects and features of the present invention in addition to those mentioned above will be pointed out in or will be understood from the following detailed description provided in conjunction with the accompanying drawings.

DETAILED DESCRIPTION OF THE INVENTION

Figure 1:
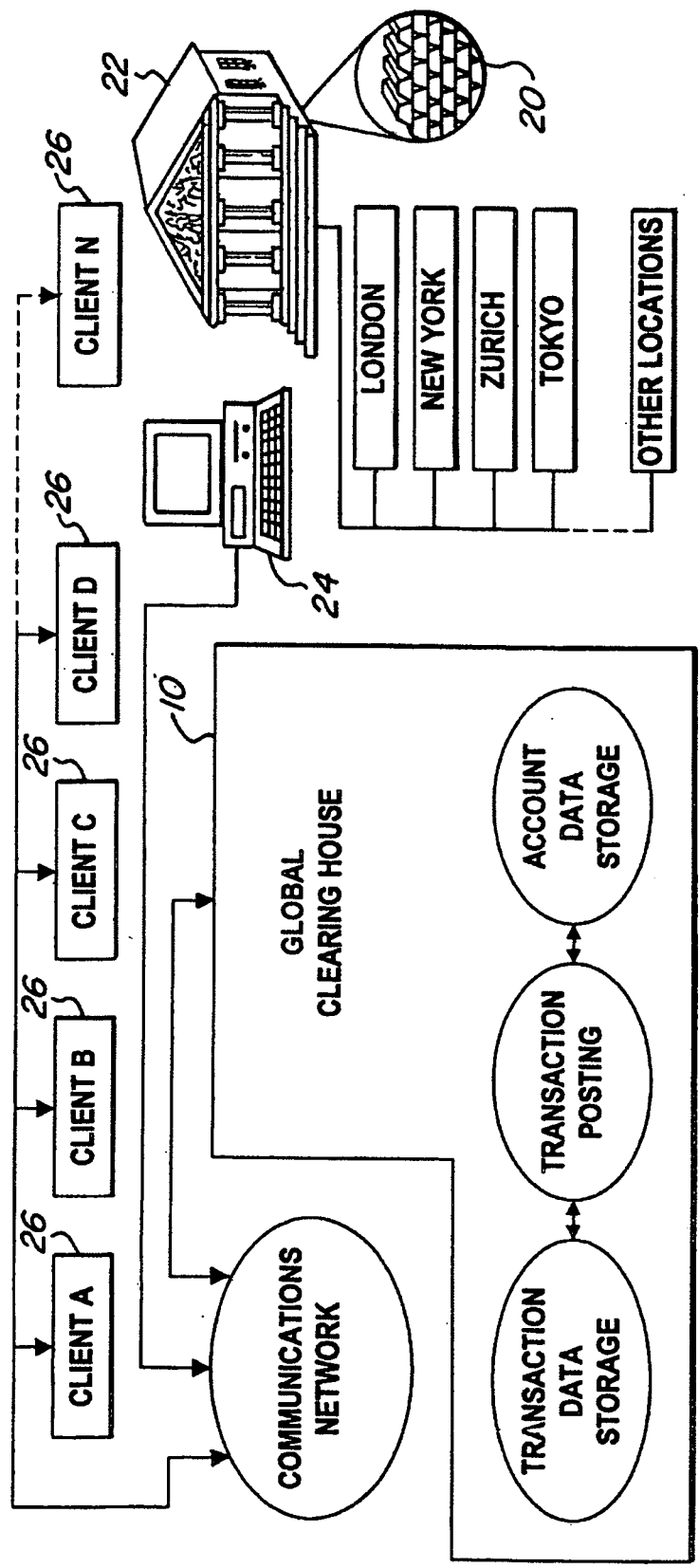
FIG. 1 is a schematic illustration of the operation of the invention.

A glossary of the terms used in the present application is provided hereafter.

As used herein, a "book-entry system"—also called "double-entry bookkeeping," is a bookkeeping method of accounting in which a debit in one individual's account is also entered as an equivalent credit in another individual's account, and vice versa. All banks currently use this method of according when handling currency payments with other banks as well as between customers within the same financial institution.

As used herein, "client software" is a software application which runs on an individual's computer, allowing him to verify and exchange ecoins with the emint, to send and receive ecoins from other individuals, and to manage his ecoins stored in the memory of his computer.

As used herein, "Digital Hallmark™" is a digital signature or any other protocol for cryptographic authentication attached to each ecoin by the emint that certifies the genuineness of information embedded in the ecoin.

As used herein, "digital signature" is information generated by a private key applied and appended to electronic data. If the electronic data is not altered after the digital signature has been applied, the signature will verify the authenticity of the electronic data when checked with the corresponding public key.

As used herein, "ecoin" is the electronic representation of a valuable commodity, preferably, a precious metal such as gold, platinum, palladium, or silver, which is held for safekeeping at a storage site. Each ecoin comprises a unique serial number, a measure of the valuable commodity (for example, grams or ounces, and fractions thereof) that it represents, the name of a specific storage site where the valuable commodity is stored, and a date/time stamp of when the ecoin was created. Each ecoin may appear as a string of alphanumeric characters which may also be encrypted and/or digitally signed for security. The "emint" is a computer and communications system which creates, distributes and verifies the authenticity of ecoins, and which receives information from the storage sites regarding gold held there for storage and specifically identified for use in the digital cash system.

As used herein, "encrypt" is to scramble data so as to prevent unauthorized reading.

As used herein, "public key" is a mathematical key which is available publicly and which is used to verify digital signatures created with the matching private key, and in the context of encrypted communications is used to decrypt electronic data which can only be encrypted using the matched private key.

As used herein, "public key cryptography" is a technique for encrypting data by which the key used to decrypt the message is different from the key used to encrypt the message. The digital signature defined above is an application of public key cryptography in that the key used to verify the signature is different from the key used to sign the signature.

As used herein, "private key" is a mathematical key which is kept private to the owner and which is used to create digital signatures, and in the context of encrypted communications, is used to decrypt electronic data encrypted with the corresponding public key.

As used herein, "storage site" is a secure facility (e.g., a vault) in which the valuable commodity (e.g., gold) is held for safekeeping. Preferably there are several storage sites for storing the commodity. The storage sites are preferably located in countries having secure and stable political systems where there is minimal risk of misappropriation of the asset by the government or private persons. The storage sites will typically be a precious metal repository; however, other secure vault facilities could also serve as the storage slits. Typical site locations would be London, New York, Zurich and Tokyo, as well as other locations.

The storage site provides facilities for safe and secure storage of the commodity to be used as the asset basis for the electronic cash. Typically such storage sites consists of a protected vault. The precious metal repository or protected vault that is servicing the system users will have the ability to (1) receive the commodity from a client, (2) return the commodity to a client, (3) test the purity of the commodity, (4) measure the weight and/or other physical properties of the commodity, (5) provide identifying information for each parcel of the commodity placed within the storage site in order to distinguish between the different parcels belonging to the different clients of the storage site, (6) report to the emint and/or client the quantity of the commodity stored by the client at the storage site, and (7) provide identifying information and the capability to physically separate from the total quantity of the commodity stored in the storage site those parcels of the commodity to be designated for use as currency.

The valuable commodity stored at each storage site must be non-perishable, and most preferably has a high ratio of value to weight and volume. In a preferred embodiment, the commodity comprises a precious metal, such as platinum, palladium, or silver, or most preferably, gold of a specified purity. In the following discussion, gold is given as the example usage, but it is to be appreciated that other precious metals, tangible assets, and valuable commodities could also be used.

The system of the invention requires some system users to establish a fiduciary relationship with a storage site. The relationship is confirmed when a system user either (1) stores gold with, or (2) purchases from another person gold already held at one or more storage sites. In the first case, the storage site verifies the receipt of the gold and provides confirmation to the system user specifying the pure weight and/or other physical attributes of the gold. In the second case, the storage site records the transfer of gold from one system user to the other.

Then the system user informs the storage site that he wishes to allocate some or all of his gold for use in the digital payment system. The storage site separates this specific weight of gold to be used as currency in a separate area of the vault, designated solely for storing gold in use as electronic cash issued by the system.

As used herein, a "computer system" comprises at least the following components: a central processing unit (CPU), a display device, a data storage device, and a printing capability.

As used herein, "money" is a tool that enables the participants in an exchange of goods and services to define value of the exchange.

As used herein, "currency" means the physical representation of money. Currency is the medium of exchange enabling producers and consumers to exchange goods and services indirectly for other goods and services. Currency is denominated into units of account, which permits economic calculation by the participants in the exchange. Currency also is a means of payment which enables the participants in an exchange to settle their respective obligation.

As used herein, "cash currency" is the paper notes issued by a country's central bank. Each note is denominated in terms of a fixed number of units of account.

As used herein, "deposit currency" is the liability of the banks that accept deposits of a country's national currency.

As used herein, a "clearing house" is a center for processing transactions to credit and debit accounts held by parties to the transaction.

Referring now to the embodiment of the invention shown in FIG. 1, the invention relates to a system and method for payment and receipt of monetary units of account. More specifically, it relates to a clearing house 10 that is the center of an interactive communications network that will enables gold and/or other commodities to be used and freely exchanged as a means of payment, i.e., to be used a currency.

The clearing house has an extensive user base located within the United States and globally that will use gold and/or other commodities as a currency for effecting payments in cross-border as well as intra-country commercial transactions. Since this currency is preferably a defined weight of gold or other commodity, the currency of the clearing house will be non-national.

Each system user individually establishes a depository account with the clearing house either by storing gold or other commodity at an affiliated storage site 22 or by purchasing gold or other commodity already stored at such a storage site. The storage site will confirm the deposit of the commodity to the clearing house and transmit the information via remote terminal 24 to the computer system 26 described hereafter. Each account will be denominated in the currency of the clearing house, which is a defined quantity of gold or other commodity (for example, ounces, or kilograms of gold, barrels of oil, etc.). Every system user that establishes an account relationship with the clearing house will become a participant in the network of system users using the payment processing capability provided by the clearing house.

The network of individuals, corporations and other entities that are clients of the clearing house will use communications and information processing technology made available to them by the clearing house to effect transactions in the commodity denominated currency of the clearing house. They will (1) make payments to other members of the network, generally their suppliers, and (2) collect payments from other members of the network, generally their customers.

Though it is envisioned that the clearing house will initially establish working relationships with corporations involved in international trade and commerce, the economies of scale that will be generated by an increasing number of transactions completed through the clearing house means that in time the scope of the clearing house activities can be broadened to include transactions by individuals. The high volumes of payments and receipts now undertaken daily in the course of normal economic activity indicate that the potential opportunities for the application of this invention are very significant.

This invention therefore provides a system and method of settling of payments for transactions through a clearing house with a global scope of operation (hereafter referred to as "Global Clearing House" or "GCH").

The advantages that GCH will offer system users, which differentiates its services from other payments mechanisms now available, include (1) the ability to complete a payment without incurring the risk now inherent in existing mechanisms used to complete payment transactions, (i.e., possible loss of funds deposited in a bank which is seized or which is insolvent), (2) the ability for a client to receive immediate credit and to be immediately informed that monetary units of account have been added to the account kept by the client at GCH, (3) the ability for a client to make immediate payment and to be immediately informed that monetary units of account have been deducted from the account kept by the client at GCH, (4) the ability of a client to maintain monetary units of account on deposit without being exposed to the practice of fractional reserve banking (wherein banks do not keep as a reserve assets equal to the amount and identity of their liabilities) and thereby avoid the risks of partial or total loss of the deposit as a result of the overissue of the currency (where banks create liabilities for currency based on assets which they do not have on hand), (5) the ability of a client to maintain monetary units of account on deposit without being exposed to the risk that those monetary units of account will be loaned by the institution, and (6) the ability to use gold and/or other commodities as currency.

Gold is the preferred commodity as it is a low-risk medium of payment and it has a known value. Gold extinguishes the obligation arising from a transaction in trade and commerce. When the seller receives gold, there is no further obligation because the product sold has been exchanged for a tangible asset. However, a national currency does not necessarily extinguish the obligation incurred when the buyer acquires a product. The sellers does not receive a tangible asset. When the seller instead receives a national currency, the seller receives a promise to pay, which is principally dependent upon the central bank which issues the national currency. The obligation can be further at risk if the payment clearing bank is unable to meet its obligations to deliver the currency specified in a transaction.

Gold has thee unique advantages as money. Each of these are inherent to gold, and they are not advantages available to any national currency.

When defined to a precise weight, gold is a consistent and unvarying unit of account. An ounce of gold is knowable and unvarying. An ounce today is the same as an ounce yesterday or an ounce twenty years ago. However, a national currency does not have these characteristics. A U.S. Dollar or a Deutschemark or a Swiss Franc on deposit in Bank AAA is not the same as the same currency on deposit at Bank CCC because these two banks have different levels of capital and a different mix of assets. Therefore, Dollars or other currencies on deposit in these unrelated institutions have entirely different levels of risk, so the national currency is not a consistent and unvarying unit of account.

Gold is non-national money, which means that it is outside the scope of government. Therefore, gold is not subject to the political process because it is beyond the control of governments, their central banks and monetary authorities. The result is that gold over long periods of time tends to hold its purchasing power better than any national currency. And as et forth above, gold extinguishes an obligation on delivery.

Using gold as currency also permits the creation of financial instruments and futures contracts denominated in terms of a stated weight of gold. For example, a futures contract for delivery of soybeans cold be designated payable in gold units of account instead of in U.S. Dollars. Other commonly traded commodities, i.e., crude oil, agricultural products, etc., could be similarly designated in gold units of account. The transactions would then be processed and cleared through GCH.

The above advantages differentiate the commodity currency processed by GCH from any deposit currency now in use.

Referring now to FIG. 1, a commodity based currency system for paying accounts in accordance with the invention comprises: at least one storage site; an amount of a commodity stored at the storage site; and a computer system for implementing and recording transactions defined in units of the commodity.

Opening of an Account

The system and process of the invention require system users to establish account relationships with GCH.

The account relationships is confirmed when a system user deposits gold with GCH in one or more GCH's approved depositories. A system user makes a gold deposit or purchases another person's gold deposit and does so at a specific site. The storage site then notifies the GCH by data transmission of the identity of a person and units of gold held for account of that person that gold is available for settling transactions for the benefit of that user.

In particular, additions of currency to the system will be made in the following way: (1) the system user transfers a quantity of the commodity to be used as currency to a storage site; or (2) the system user notifies the storage site to earmark all or part of the quantity of the commodity stored at the storage site by the user. In the first case, the storage site verifies the receipt of the commodity and provides confirmation to the system user and GCH specifying the quantity and/or other physical attributes of the commodity. In the second case, the storage site separates the earmarked parcels of the commodity to be used as currency in a separate area of the storage site designated solely for use of storing earmarked parcels of the commodity comprising the currency of the GCH. Once the physical transfer is completed, the storage site notifies the GCH that the commodity has been established as currency by the system user.

The GCH then credits the account previously established by the system user at the GCH with the quantity of the commodity specified by the system user which has been established as currency and has been credited to the account of the system user. Once established in this way, the commodity earmarked at the storage site becomes eligible for use as currency, and the system user may transfer all or part of the commodity units of accounts to another account within the system.

The balance sheet of GCH reflects (1) the cumulative deposits of its system users, which are liabilities of GCH, and (2) the identical amount of gold as its assets. GCH's financial position is presented in Table No. 1.

TABLE NO. 1

GCH Balance Sheet Before Transactions

| Assets | | Liabilities | | |
|---|---|---|---|---|
| Gold Stored in London | 100 oz. | Client A | 100 oz. | London |
| Gold Stored in Zurich | 100 oz. | Client A | 100 oz. | Zurich |
| Gold Stored in New York | 175 oz. | Client B | 175 oz. | New York |
| | 375 oz. | | 375 oz. | |

The Computer System

Once a system user establishes an account relationship with GCH, the user has access to an interactive communications network giving access to a computer system. When two system users enter into a trade transaction between themselves, they effect payment through this network.

The GCH computer system is adapted for storing of data and entering the accounts and the transactions affecting the accounts of the participants in the system. Each GCH system user is provided with the means to conduct transactions in the user's account maintained with the GCH. Each account typically includes the name, address and other identifying information of the account holder, a unique account number assigned to each account, an inventory of transactions conducted through each account, and the means to verify the accuracy and authenticity of each transaction conducted for an account when instructed by the account holder. In logging to the system, the user will typically use an account number to identify himself, and will use a password as verification to gain access the account.

The computer system thus includes an account data storage device, a transaction data storage means, and a transaction posting means.

The account data storage device is capable of recording data identifying the system user and a number of units of the commodity credited to the user and held for the account of the user.

The transaction data storage means receives and stores records of transactions which are denominated in units of the commodity. These records of transactions include an identification of a system user who will receive a debit, a system user who will receive a credit, the amount of such debit, the amount of such credit, and may also identify the identity of the storage site.

The transaction posting means extracts data from the records of transactions and posts debits and credits to the account data storage device to instantly update the data identifying the number of units of the commodity held for the account of each person involved in the transaction.

The system preferably includes a remote terminal 24 at the storage site 22 for receiving and sending data to the computer system upon opening or closing of an account and/or when there is a transfer of units of gold. The data is transmitted from the storage site to the transaction data storage device and includes an identification of units of the commodity 20 held at the site for the account of such person.

The system permits remote access from client terminals 26 to submit transaction records to the system 10, and provides verification means for verifying the bona fides of the person seeking to submit transaction records. This permits the user access to the computer system through an interactive communications network from a location remote from either the GCH or the deposit site.

Typically, the account holder will use a computer which instructs a modem which provides access to the computer system by dialing telephone numbers available to the GCH system users; or will access the system via an encrypted internet connection. Once the centralized computer of the GCH 10 is accessed in this way and once entry is made by providing a series of passwords or security codes to prevent unwarranted and unwanted access, the GCH client has access to the chosen account to which it is the account holder. Once access has been granted, the account holder may review the account, conduct transactions for the account, review past transactions or other data stored by the centralized computer for the account.

Access to the centralized computer of the GCH permits real time, instantaneous transfers of units of account. To transfer units of account of the commodity in order to complete a financial obligation, the system user (hereafter the "paying client") instructs the GCH (1) to debit from the paying client's account a specified quantity of the commodity, (2) the day and time the specified quantity of the commodity is to be transferred, (3) the account number and other verifying information to specify the identity of the client (hereafter the "receiving client") to whom the payment will be made. A password may optionally be required at the time of posting a transaction, in order to provide security and protection from unauthorized transactions, however, in most instances, the use of a password at logon to the system will be considered sufficient.

The centralized computer of the GCH collects the transfer instructions provided by the paying client and enters those instructions into a transaction file maintained to record the authorized transactions for all paying clients. When the appointed day and time is reached, the centralized computer of the GCH completes the transaction by debiting the account of the paying client for the quantity of the commodity instructed by the paying client, and simultaneously credits the account of the receiving client instructed by the paying client. The credit made to the account of the receiving client is made simultaneously as a debit of the account of the paying client. Once the credit of the commodity units of account is made to the designated account of the receiving client, the receiving client has immediate access to those commodity units of account, thereby extinguishing the obligation of the paying client to the receiving client.

For example, A and B enter into a transaction in which A agrees to purchase from B a specific good/service. The price is agreed between them to be 25 ounces of gold. GCH is then instructed by A to debit A's account for 25.0000 ounces and pay this amount to B's account. Accounting of gold in ounces should be to at least four decimal points, though five or more decimal points could be used if greater precision in the measurement of value in the exchange is required.

GCH confirms immediate payment to both A and B. The gold is not moved from the storage facility. It remains in the same location, but is now stored there by GCH for the account of B instead of A. This changed position is presented in Table No. 2.

The total assets and liabilities of GCH remain unchanged. Only the composition of the liabilities changes, and it only changes after GCH performs its payments function.

The net result of this transaction is that gold is circulating as currency. Gold is used as a monetary unit of account in a transaction of trade and commerce entered into between A and B, and it therefore is circulating as currency even though it remains in safe and secure storage.

TABLE NO. 2

GCH Balance Sheet After Transactions

| Assets | | Liabilities | | |
|---|---|---|---|---|
| Gold Stored in London | 100 oz. | Client A | 100 oz. | London |
| Gold Stored in Zurich | 100 oz. | Client A | 75 oz. | Zurich |
| Gold Stored in New York | 175 oz. | Client B | 25 oz. | Zurich |
| | | Client B | 175 oz. | New York |
| | 375 oz. | | 375 oz. | |

GCH uses a tangible asset (i.e., a defined weight of gold) as the basic monetary unit of account. GCH is a clearing house with assets that are identical to its liabilities. In other words, GCH does not monetize debts and thereby turn the debit obligations of borrowers into currency. GCH will have on hand as an asset the total weight of gold it owes to its depository clients. The Monetary Balance Sheet of GCH is substantially different than that of the Dollar, any national currency, or any existent bank as shown in Table 3.

TABLE NO. 3

Monetary Balance Sheet of Global Clearing House
(Denominated in Units of Account Called Ounces)

| "Quality of Money" Assets | | "Quantity of Money" Liabilities | |
|---|---|---|---|
| Gold Stored in Secure Storage | 375 oz. | Client Deposits | 375 oz. |
| | 375 oz. | | 375 oz. |

In contrast to any national currency, the "quality of money" is identical to the "quantity of money" on the balance sheet of GCH. This common identity of assets and liabilities illustrates a unique advantage available to users of the invention. Identical assets and liabilities provides certainty that payments will be made as directed and without risk.

Closing of an Account

A system user can subsequently "cash out" of the GCH system by either (1) selling his gold interest to another; (2) withdrawing the user's gold deposited at a storage site. At this point, the storage site will notify the GCH that the system user's gold units of account are no longer available to the system, for example, by entering information in the remote terminal at the storage site.

In summary, the invention comprises an electronic commodity based system for conducting financial transactions, comprising: (1) at least one storage site having secure facilities for storage of a commodity; (2) an inventory of a valuable commodity stored in the secure facilities at a storage site, with units of the valuable commodity held at the storage site for an identified account; and (3) a computer system for processing data for accounting transactions denominated in units of the commodity. As would be understood, the identified account can be owned by an individual or a legal entity, such as a corporation, limited liability company, or partnership, or a government. The account can be "identified" simply by an account number, such as has been provided by so-called "numbered" Swiss or Caribbean bank accounts, or by a more complete information set specifying name, address, contact etc. The identification must be such to allow debiting and crediting of the proper parties to any transaction. It should be noted that the nits held for an identified account can be a direct holding, e.g., specific units of commodity held at a specific site can be held for a specific account, or a group of units of commodity can be held for a group of accounts, or an indirect holding, e.g., the units of commodity held at one or more sites can be held in a trust for the benefit of all of the accounts open in the system.

The computer system has data storage devices such as a hard drive, optical drive, RAM memory devices, flash memory devices, optical storage units or the like, and data processing software that records a balance of units of commodity credited to each account. The software receives records of transactions transferring an interest defined in units of the commodity from one account to another identified account. The records of transactions include at least an identification of an account that will receive a debit, an account that will receive a credit, an amount of a debit of a quantity of said units of said commodity, and an amount of a credit of a quantity of said units of said commodity. These records of transactions are entered to update data regarding the balance of units of commodity credited to each account. The electronic commodity based system permits persons to conduct financial transactions without reliance on national currencies in conducting said financial transactions whereby obligations, of a person receiving a said debit of said units of said commodity of the person's account, to an other person receiving a said credit of said units of said commodity to the other person's account, are extinguished upon posting of said records of transactions, thereby eliminating payment risk.

Figure 2:
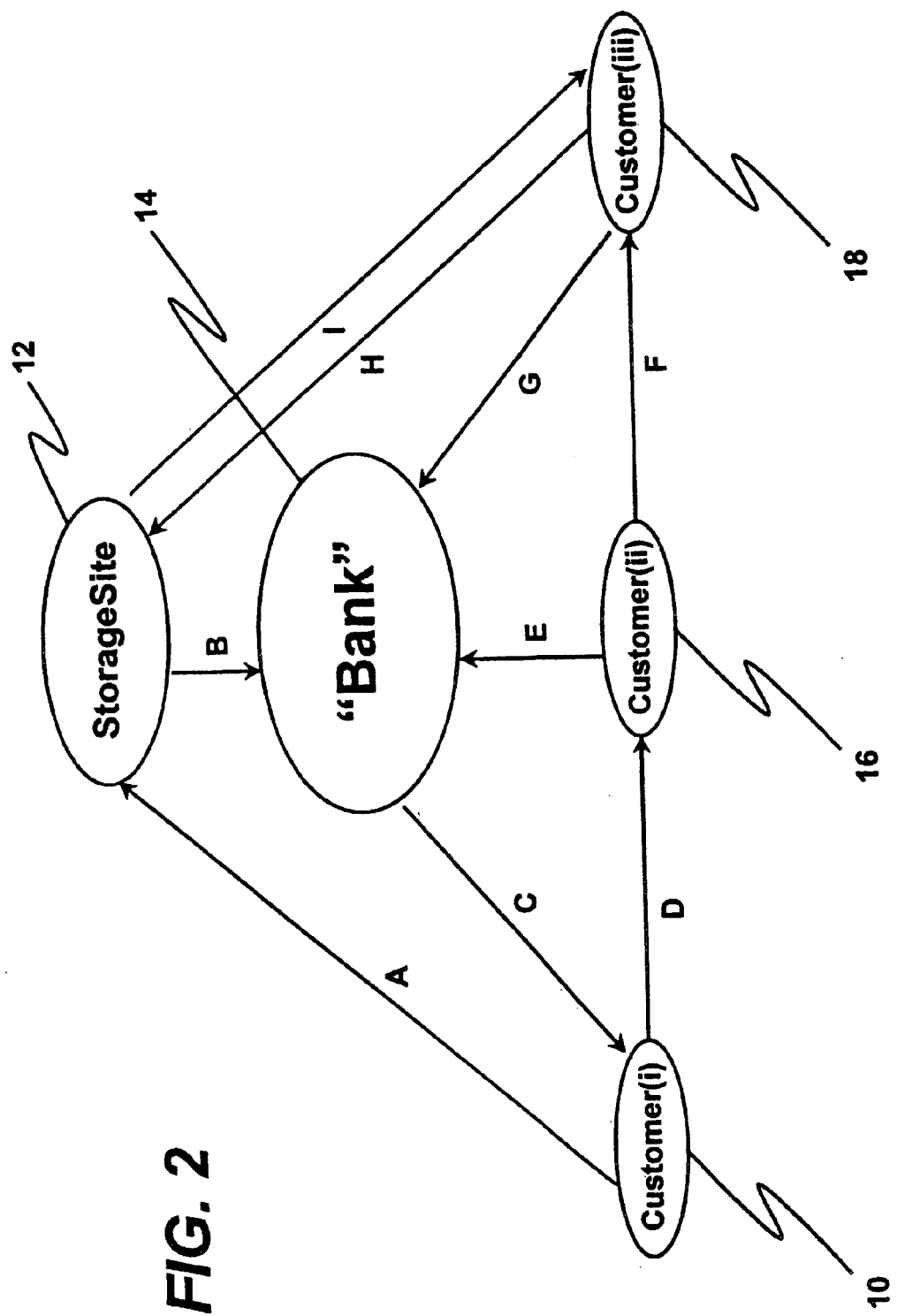
FIG. 2 shows a flowchart illustrating the operation of an asset-based electronic cash system in accordance with a second embodiment of the invention.
Figure 3:
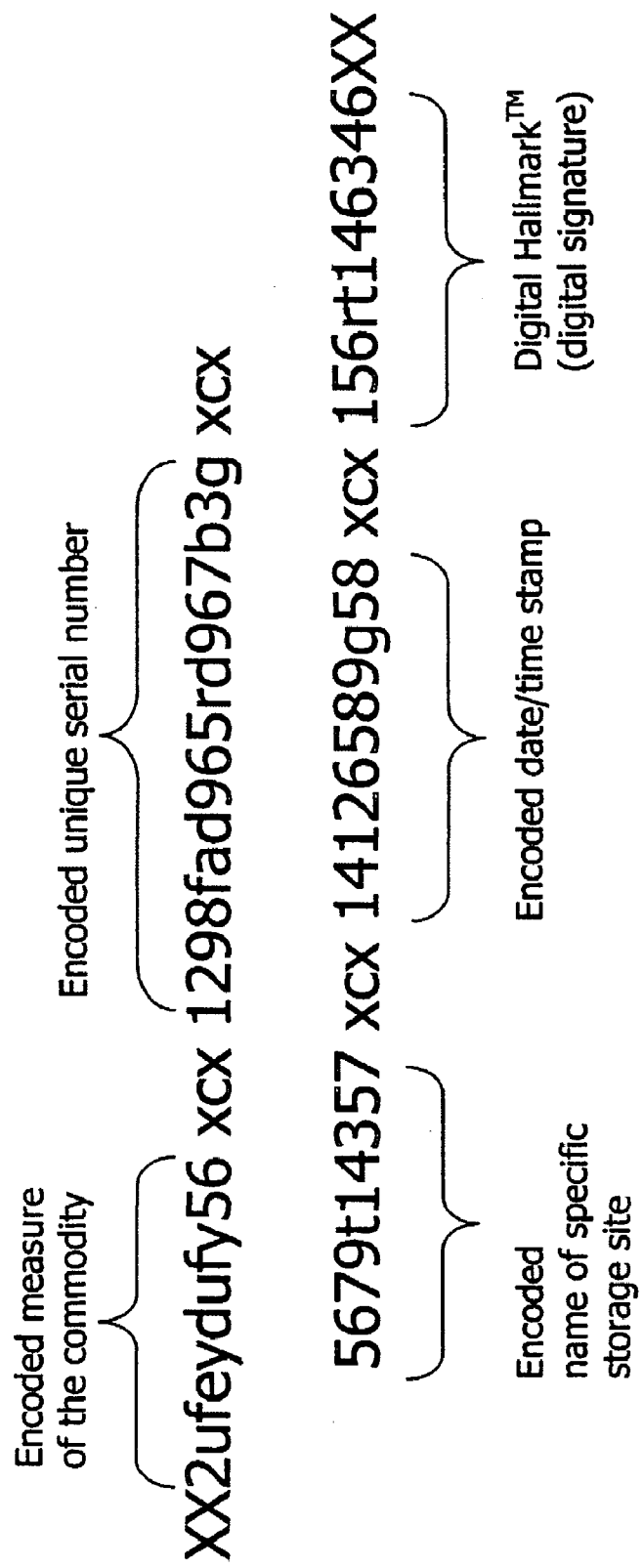
FIG. 3 is an illustration of an electronic coin in accordance with the invention.

In an alternative embodiment, shown in FIG. 2, instead of establishing a double entry bookkeeping system for electronic payments, the computer system includes an emint which electronically creates ecoins in a variety of weights. Each ecoin includes information embedded in it comprising: a unique serial number, the weight (denominated in either grams or ounces of other physical measurement) of the gold that it represents, possibly the name of the storage site where the gold is stored, and the date that the ecoin was created. The emint maintains a database of each ecoin it tissues, identified by serial number. When anonymity to the users of the system is not assured, the database of the emint may also include the information embedded in the ecoin, such as the weight, identification of the storage site, and the date and time of issue.

Using public key cryptography the emint digitally signs each ecoin with its private key, thus providing each ecoin with a Digital Hallmark™. Blinding techniques may also be used to ensure the privacy of the user (the payer) of the ecoin. The Digital Hallmark™ allows an individual running that emint's client software to verify that an ecoin was in fact issued by the emint and is not a forgery.

Although the Digital Hallmark™ prevents an individual from creating fraudulent ecoins, it does not permit him for duplicating real ecoins (which can be simply a string of text, and thus easily replicated) in an attempt to spend them twice. For instance, the emint may issue an ecoin to someone who then makes five copies and sends them to five different people.

To prevent multiple spending of the same ecoin, the emint maintains a database of serial numbers of ever circulating ecoin so that a payee can contact the emint and confirm the value of each ecoin received (i.e., to make sure the serial number in the database is not recorded as already spent). Confirmation of value may be made nearly instantaneously.

A payee, who has confirmed the value of the ecoin, may then tender it to be emint. Upon tender, the emint will record the serial number of the tendered ecoin as a "spent" ecoin so that it may be subsequently reused by the user. The payee can request that the emint treat the tendered ecoin different ways. The emint could be requested to credit the tendered ecoin to the payee's gold safekeeping account with the storage site; or the payee could request that the units of gold represented by the ecoin be converted to a national currency such as U.S. Dollars and that the U.S. Dollars be transferred by check, wire or other methods to another account; or the payee could request the issuance of a new ecoin to be delivered to the payee for use by the payee in other transactions.

It is to be appreciated that the emint will be responsible for collecting storage fees associated with the stored gold in the digital cash system held for the benefit of the system users. Usually such fees may be periodically charged against the amount of gold in a user's safekeeping account at the storage site. However, when an ecoin has been issued, the gold on account for a system user is treated as withdrawn from the user's safekeeping account in exchange for the ecoin. The emint will desirably recover the storage costs associated with the stored gold that has been converted to ecoins in some way. It is to be appreciated that it would not be feasible to simply charge the user to whom the ecoins were issued during the length of time between issuance and tendering of the ecoin, as this would permit an identification of the link between the user and the payee, since to charge the user for the storage costs that might be associated with an ecoin presented by a payee, the user-payor must necessarily be identified. This approach would compromise the desired privacy of the payment transaction.

One method to recover storage costs would be to simply charge a transaction charge associated with the issuance of the ecoin, such that over time, and on an average basis the emint is able to recover the storage costs. A more sophisticated method would be to collect the storage costs from the tendered ecoin. Obviously, the payee may not wish to be responsible for the prior incurred storage costs of the user, and thus, as part of the confirmation process, the amount of the storage fee cost would not be reported. This could would be determined simply from the information embedded in the electronic coin, specifically, based on the date/time stamp showing the moment of issuance of the electronic coin, and the weight of gold involved.

The client software could be designed to calculate the storage fees associated with an ecoin upon its receipt. Alternatively, as part of the value confirmation process, a report to the payee could include both whether or not the ecoin was valid, and its net value after the storage costs are deducted, and any other costs that might appropriately be charged by the emint, as for example, a processing charge for the confirmation or for handling the tender of the ecoin. Thus, for example, if a payee receives several ecoins with a value of 1.237 grams of gold, the weight of gold may be reduced, for example, to 1.235 grams, upon confirmation at the emint because of the storage fee they have accumulated while being held by the payer.

The client software can be set up by a payee to define what is an acceptable net value of ecoins received from the user (payer). If the storage fee is sufficiently high such that the net value of the ecoins is less than the acceptable net value, the ecoins are returned by the payee to the payer with notification of their rejection by the payee. The payer may then choose to forgo the transaction, or he must provide the payee with additional or substitute ecoins.

In another embodiment, the client software can be set up by a payee to define what is an acceptable storage cost to accept, and if the storage fee exceeds the predefined amount, the same process of rejection will occur.

In one embodiment of the invention, the value confirmation and tendering steps are not permissible as separate transactions, but instead are always performed concurrently. In such cases, the default mode of operation will have the emint issue new ecoins and transmit them to the party requesting confirmation of ecoins, less the appropriate feeds, whenever an ecoin is submitted for confirmation.

The anonymity and privacy of the payee is particularly protected where the payee simply requests issuance of a new ecoin (instead of a deposit to an existing account or conversion to national currency). In this case, the emint's process includes the following steps: (1) the emint records the serial numbers of the received ecoins to designate them as spent, (2) computes a confirmation fee and, if appropriate, a storage fee, (3) creates new ecoins (with different serial numbers) that represent the value of the old ecoins less the confinement fee and any storage fee, and (4) then electronically sends the new ecoins to the payee. This payee can then make further payment transactions in the same way as the original user. It is noted that in this type of transaction, in order to preserve the anonymity of the payee, the emint may choose not to take note of the identity of who is being issued the new ecoins. The emint operates solely as a database for outstanding and spent ecoins. Its only functions are to confirm ecoins at a payee's request, issue new ecoins, and collect the appropriate confirmation and storage feeds. The emint may also incorporate blind signatures into its Digital Hallmark™ to further advance user privacy.

An example of an asset based electronic cash system in accordance with the invention is shown in FIG. 2. Customer (i) 10 stores gold at a storage site 12 and requests the storage site to send him ecoins (arrow A). The storage site contacts the emint 14 and informs it of the receipt of new gold (arrow B).

The emint creates ecoins (not shown) whose total sum represents the exact weight of new gold and transfers the newly created ecoins to the storage site, each ecoin containing a Digital Hallmark™ used for verification purposes (arrow C). After obtaining the client software, which is necessary in order to receive ecoins from others and to confirm with the emint the value of each ecoin received, Customer(i) contacts the storage site to receive the ecoins and the ecoins are transferred to him (arrow D). The customer may then verify the Digital Hallmark™ applied thereto using the emint's public key. Customer(i) can also send the ecoins to the emint for confirmation (arrow E). The emint then confirms the value of the ecoins. As noted above, the emint may be set up so that upon a request for confirmation, the emint automatically retires the ecoins, deducts the confirmation and storage fees, then creates and sends back new ecoins to Customer(i) (arrow F).

Alternatively, the emint could transmit the ecoins directly to Customer (i), who can verify the Digital Hallmark™ applied thereto using the emint's public key.

Once Customer(i) receives the ecoins, he can transfer the ecoins while online to Customer(ii) 16, who also has the client software, for the payment of goods or services (arrow G). Customer(ii) then can send the ecoins to the emint for confirmation (arrow H). The emint then confirms and retires the coins, deducts storage and confirmation fees, then creates and sends new ecoins back to Customer(ii) (arrow I). Customer(ii) need not have an account relationship with the storage site. Customer(ii) can then send the ecoins to Customer(iii) 18, who also has the client software, for the payment of goods or services (arrow J). Customer(iii) can then send the ecoins to the emint for confirmation (arrow K). The emint confirms and retires the ecoins, deducts storage and confirmation fees, then creates and sends new ecoins back to Customer(iii) (arrow L).

Ecoins are taken out of circulation when a party, such as Customer(iii), sends ecoins to the storage site and requests redemption of them into gold bullion (arrow M). The storage site sends the ecoins to the emint for confirmation, along with a message saying that the gold is being redeemed (arrow N). The emint verifies the ecoins, deducts the appropriate storage and confirmation fees, and sends a message back to the storage site stating the exact weight of gold left over (i.e., the weight of gold originally represented by the ecoins less the storage/confirmation fees) for redemption (arrow O). The storage site then ships the specified weight of gold bullion to the individual who requested it (arrow P), or enters a credit for an amount of gold held for safekeeping for Customer (iii) at the storage site, or takes such other actions as instructed.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A computer program product for use in conjunction with a commodity-based system for conducting financial transactions, the system including at least one deposit site having secure facilities for storage of a quantity of fungible precious metal, said computer program product embodied on computer-readable medium and comprising code that, when executed on a computer, causes the computer to perform the following steps:

create an electronic data file having a unique serial number associated therewith, and store said electronic data file as one of a plurality of electronic data files;

identify an amount of the fungible precious metal represented by said electronic data file and store the identified amount as part of said electronic data file, the identified amount being no greater than a deposit of the fungible precious metal having been previously received at the secure facilities, whereby a total amount of fungible precious metal represented by the plurality of electronic data files is no greater than the quantity of fungible precious metal stored in the secure facilities;

identify a date associated with said electronic data file, said date indicating the date when said electronic data file was crated, and store the date as part of said electronic data file;

create a digital signature for authenticating said electronic data file, and store the digital signal as part of said electronic data file.

2. A computer program product in accordance with claim 1 wherein said computer data are digital data.

3. A computer program product in accordance with claim 1 wherein said precious metal comprises gold.

* * * * *